United States Patent [19]
Daniel et al.

[11] Patent Number: 5,606,558
[45] Date of Patent: Feb. 25, 1997

[54] METHOD OF AND DEVICES FOR TRANSMITTING IN ATM CELLS INFORMATION SUPPLIED IN THE FORM OF A SERIES OF DISTINCT ENTITIES FOR A GIVEN APPLICATION

[75] Inventors: Patrick Daniel; Piotr Szychowiak, both of Illkirch, France

[73] Assignee: Alcatel N.V., Amsterdam

[21] Appl. No.: 320,744

[22] Filed: Oct. 11, 1994

[30] Foreign Application Priority Data

Oct. 12, 1993 [FR] France .................................. 93 12116

[51] Int. Cl.⁶ .............................. H04J 3/26; H04L 12/56
[52] U.S. Cl. ...................... 370/395; 370/474; 370/522; 371/2.1
[58] Field of Search .............................. 370/43, 60, 60.1, 370/84, 94.1, 94.2, 94.3, 82, 99, 110.1, 102; 371/2.1, 30, 35, 37.1, 37.2, 37.7, 53, 57.1, 57.2, 60

[56] References Cited

U.S. PATENT DOCUMENTS

| | | | |
|---|---|---|---|
| 4,516,239 | 5/1985 | Maxemchuk | 370/94.2 |
| 4,999,835 | 3/1991 | Lagoutte | 370/94.1 |
| 5,260,783 | 11/1993 | Dixit | 370/94.2 |
| 5,375,121 | 12/1994 | Nishino et al. | 370/94.2 |
| 5,379,297 | 1/1995 | Glover et al. | 370/94.2 |

OTHER PUBLICATIONS

Ikuo Tokizawa et al, "Transmission Technologies for BISDN", *NTT Review*, vol. 3, No. 3, May 191, pp. 44–58.
Moors & Cantoni, "ATM Receiver Implementation Issues". *IEEE Journal on Selected Areas in Communications*, vol. 11, No. 2, Feb. 1993, pp. 254–263.
French Search Report FR 9312116.
Tadashi, Patent Abstracts of Japan, JP6021446 vol. 5, No. 74.
Stallings, "Data and Computer Communications", Macmillan Publishing Company, pp. 133–135.

*Primary Examiner*—Hassan Kizou
*Attorney, Agent, or Firm*—Sughrue, Mion, Zinn, Macpeak & Seas

[57] ABSTRACT

ATM cells are used to transmit information supplied in the form of a series of separate, identically structured entities each corresponding to a whole independently usable by a given application. Each entity is transmitted as cells whose information field is identically composed of modules of fixed position and fixed size. A first module constitutes a cell continuity index. A second module contains entity data to be transmitted. A final module is established by means of a B. C. H. block type error detector-corrector code. A transmitter and a receiver include apparatus for implementing the method between a source application and a destination application across an ATM network.

11 Claims, 4 Drawing Sheets

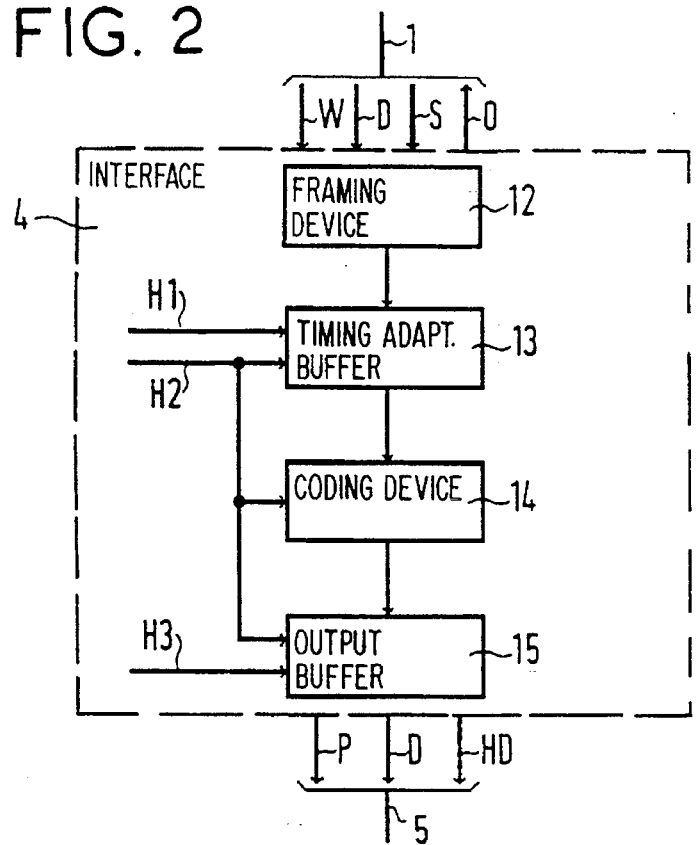
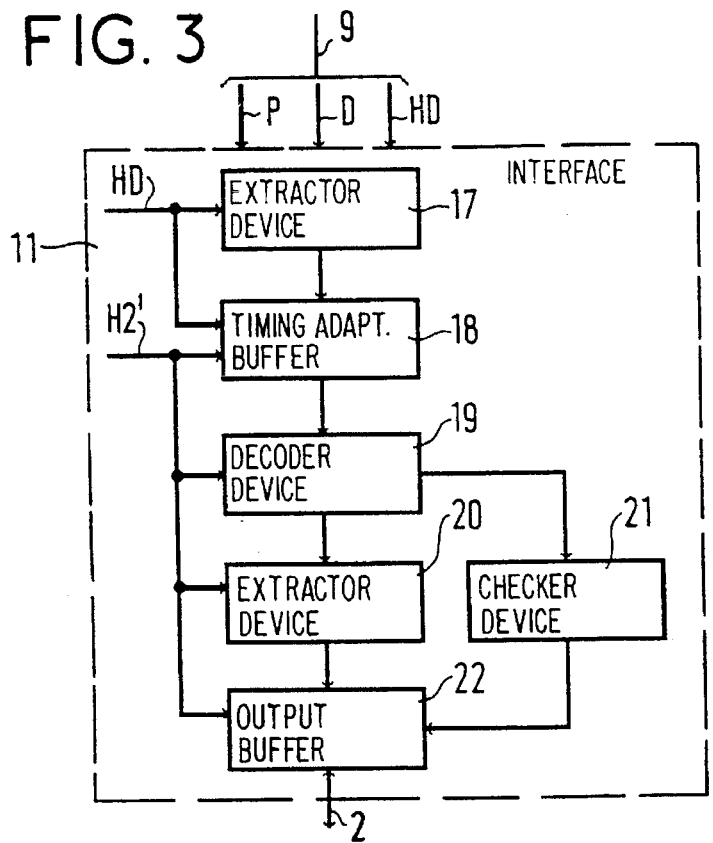

METHOD OF AND DEVICES FOR TRANSMITTING IN ATM CELLS INFORMATION SUPPLIED IN THE FORM OF A SERIES OF DISTINCT ENTITIES FOR A GIVEN APPLICATION

BACKGROUND OF THE INVENTION

1. Field of the Invention

The invention concerns a method of transmitting in ATM cells information supplied in the form of a series of separate, identically structured entities each corresponding to an independently usable whole for a given application. It also concerns devices for implementing this method.

2. Description of the Prior Art

The method is more particularly intended for use in a broadband integrated services digital network, in the adaptation layer between the layer corresponding to the asynchronous transfer mode (ATM) network and the top layer corresponding to the application concerned (reference model defined in CCITT Recommendation I.321).

The cells used to transmit the entities are preferably ATM cells as defined in CCITT Recommendation I.361.

The information to be transmitted from a source application is in analog form and can be organized into a series of entities with the same structure in which each entity represents a whole independently usable by the application to which the information is sent.

The entities of a series from the same source application are transmitted in succession in order to enable the flow of information from they originate to be reconstituted; they must therefore be receivable at a clock rate which is at least relatively regular, i.e. possibly subject to some degree of jitter.

In practise these entities are modular units of information, for example audio or video information, the respective sizes of which may vary.

In the case of audio information, for example, an entity represents a set of digital data representing selected energy components calculated from a group of "s" successive samples of a stream of audio information.

In the case of video information, for example, an entity represents a set of digital data representing an image to a specific format.

The temporal stringing of the entities is usually a service interpreted at the destination.

As already mentioned, the throughput of information transmitted by the entities can vary, especially when (as in the above example) the original data relating to each entity undergoes quantizing and statistical coding prior to transmission.

As mentioned above, it is essential that, as far as possible, every entity sent can be recovered after ATM transmission from its source to its destination. When ATM is used, errors can occur that are specific to the transmission of entities by means of cells, in addition to known errors that may occur at the level of the data bits which form the cells. There is therefore the risk of the network sending a cell somewhere other than its real destination in the event of an error in that part of the cell defining its destination that is either undetected or is not corrected properly.

The invention therefore proposes a method of transmitting in ATM cells analog information supplied in the form of a series of separate, identically structured entities each representing a whole independently usable by a given application, the method being intended to offer a high quality of service to the user, in particular by enabling good detection and good correction of transmission errors and elimination of entities that cannot be recovered on reception.

Each cell includes a header in which its destination is defined and an information field, each of which has a respective standard size.

SUMMARY OF THE INVENTION

In one aspect, the present invention consists in a method of transmitting in asynchronous transfer mode (ATM) network cells analog information supplied in the form of a series of separate, identically structured entities each corresponding to a whole, independently usable by a given application, each cell including a header in which its destination is defined and an information field, each having a respective standard size, in which method each entity is transmitted by means of cells whose information field is identically composed of a plurality of modules each of fixed position and fixed size, a first of said modules constituting a cell continuity index, modulo "p", which is incremented for each new cell needed to transmit the same entity in successive cells, a second of said modules containing entity data to be transmitted, a last module being made up of a B. C. H. block type error detector-detector code obtained by calculation prior to transmission on the basis of the sequence of bits of other modules of the information field of the cell which includes it, and in which method the second module of the information field of the first and the last cells relating to the same entity respectively include a start of entity marker at the start of the module and an end of entity marker at the end of the module.

In another aspect the present invention consists in a transmitter for implementing this transmission method including entity framing means for processing digital data relating to each entity supplied by a source application at a clock rate specific to said source application, adapter buffer means for processing said digital data at a local processing clock rate for packaging them into successive cells, including first means producing by incrementation the first cell continuity index module and second means generating an error detector-corrector code module for each cell from the series of bits intended to constitute the other information field modules supplied for this cell, the transmitter further including output buffer means for supplying the cell data under conditions and at a clock rate selected for transmission.

In a further aspect the present invention consists in a receiver for implementing the above transmission method including extractor means at the receiving end for dissociating the information field of a cell received from the header of the same cell, input buffer means for processing at a local processing clock rate the information field data of cells received, decoder means adapted to separate the first module and the last module from the remainder of the information field data of the cells received, and optionally for reconstituting by means of the corrector code the monitored part of the information field of a received cell in which not more than two bits are incorrect, means for checking the continuity of the continuity index modules successively received, means for separately extracting the second module from each cell received and output buffer means from which either each entity is supplied or at least one error marker is supplied substituted for an erroneous entity either under the control of the decoding means in the case of reception of an incorrect entity cell that cannot be corrected or under the control of verification means in the case of an index incrementing discontinuity for a first cell module of an entity.

The invention, its features and its advantages are explained in the following description with reference to the figures listed below.

BRIEF DESCRIPTION OF THE DRAWINGS

FIGS. 2 and 3 respectively show block diagrams of a transmitter and a receiver adapted to implement the method of the invention.

DETAILED DESCRIPTION OF THE PREFERRED EMBODIMENT

Figure 1:
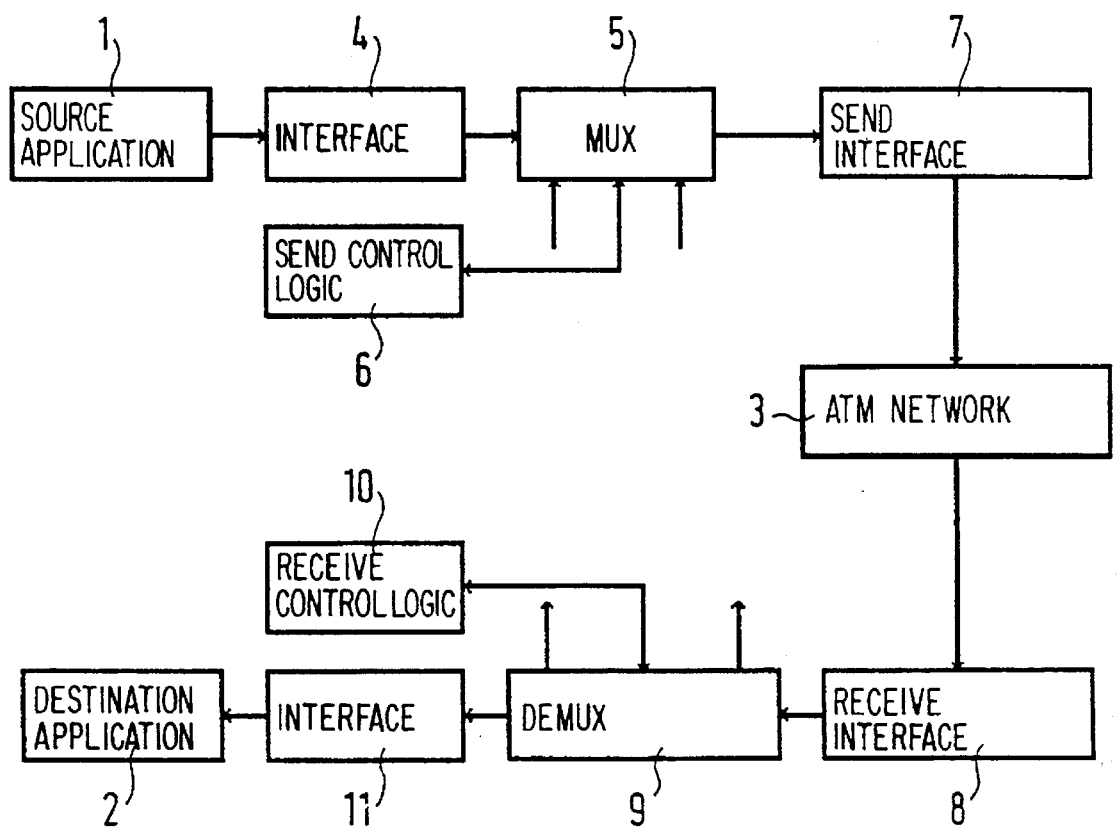
FIG. 1 shows a block diagram of a system for implementing the transmission method of the invention.
Figure 4:
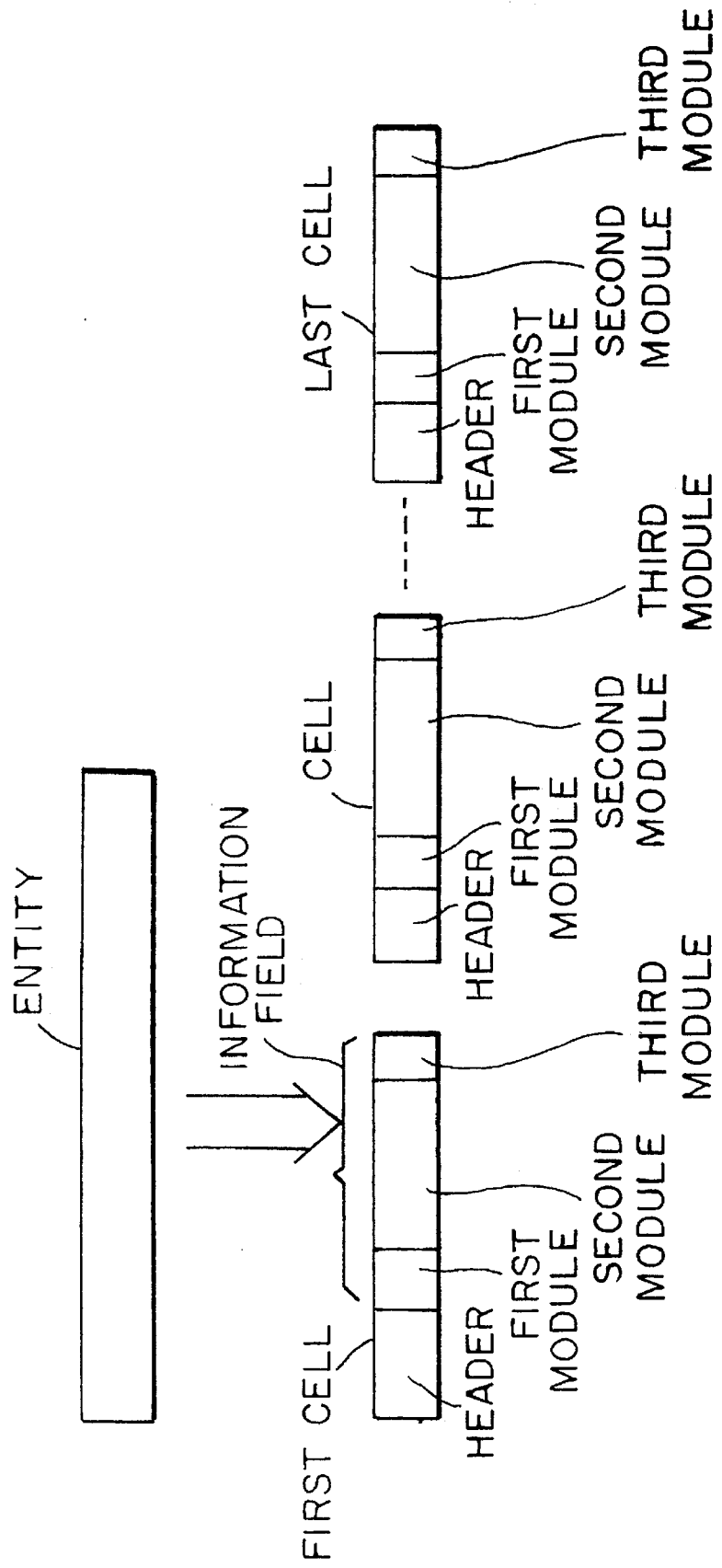
FIG. 4 shows the structure of the entities, cells and modules of the present invention.
Figure 5:
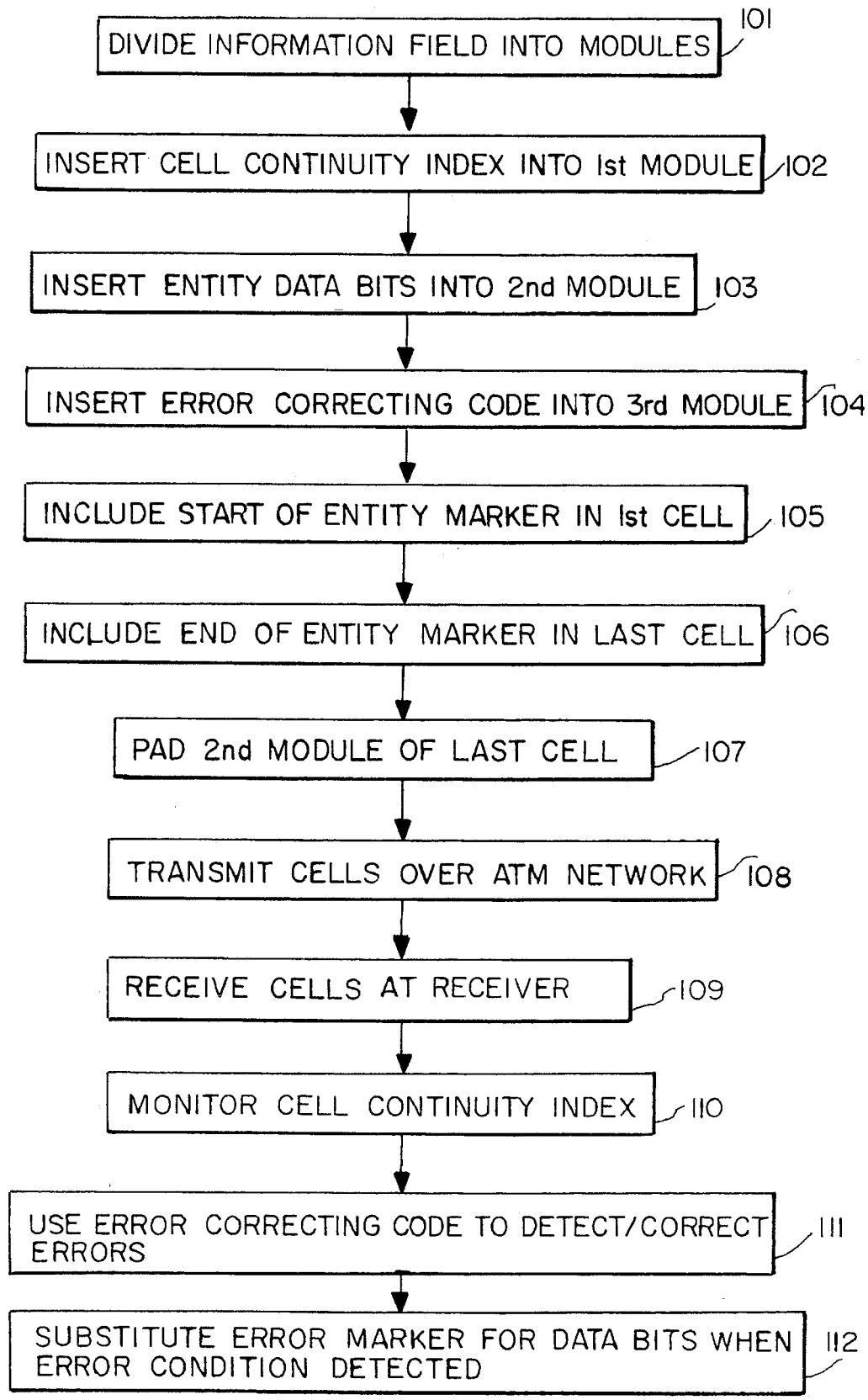
FIG. 5 is a flow chaff of the steps of the present invention.

As mentioned above, the information transmission method of the invention enables a source application 1 to communication with a destination application 2 through a transmission medium in the form of an asynchronous transfer mode (ATM) network 3. The source application 1 supplies a stream of information of the same kind in the form of a series of separate, identically structured entities each constituting a whole independently usable by the application to which the stream of information is sent. The source application 1 uses an interface 4 to transmit series of entities produced by this application to the network 3. As will be described in more detail below, the interface is adapted to insert data bits constituting the entities into the information fields of the cells by means of which the data is transmitted across the network.

A multiplexer 5 is connected to the output of the interface 4 and enables insertion of bits from other sources, including a send control logic unit 6, into the stream of cells transmitted to the network 3.

A send interface 7 connects the output of the multiplexer 5 to the network 3, carrying out the adaptation needed for transmission of the cells output by the multiplexer via the network.

A receive interface 8 carries out the converse adaptation to the cells transmitted via the network to the destination application 2.

A demultiplexer 9 separates cell bits addressed to units such as a receive control logic unit 10 from those to be used by an interface 11 to the destination application when reconstituting a series of entities to be transmitted to that application.

Generally speaking, and as is well known, the implementation of the various units constituting the system described above is closely associated with the intrinsic characteristics of the application and the network.

To the extent that the various units constituting the system as explained above are well known to the person skilled in the art, only the units characteristic of the interfaces 4 and 11 are described further.

As mentioned above, and as is also well known, an asynchronous transfer mode (ATM) network like the network 3 transmits digitized information by means of identically structured cells. Each cell includes two main fields, an information field which receives digitized information to be transmitted and a header which, among other things, defines the destination of the information bits contained in the information field of the same cell.

As a general rule, the entities to be transmitted from a source application are likely to have a size greatly exceeding the capacity of the information field of a cell, given that, in the case of cells structured in accordance with Recommendation 1.361 referred to above, the header and information field of a cell have respective sizes of 5 octets and 48 octets.

It is therefore necessary to use a plurality of successive cells to transmit the data bits of information relating to the same entity from a source application and to be able to recombine these cells at the destination application, after transmission, in order to reconstitute the entity from which they originated.

Consequently, the information field of each entity transfer cell is identically organized, this field being divided into a plurality of modules each of fixed size and fixed position.

In one embodiment of the invention the information field includes a first module for a cell continuity index modulo "p" which is incremented each time that an additional cell is needed to transmit the same entity. The modulo is 8, for example, thus implying reservation of three bits at the start of the information field for each first module.

Cells lost and cells gained can be detected by verifying the regularity of incrementing the first modules relating to cells successively received at the interface 11 of a destination application. Cells can be lost because of uncorrected transmission errors affecting the header fields of cells transmitted across the network 3 by the source application. Cells can be gained because of uncorrected transmission errors affecting the header fields of cells from other source applications addressed to other destination applications.

A second module contains data bits of the entity to be transmitted. These bits are distributed, for example, according to their successive positions in the entity containing them into the second modules of the cells of increasing modulo which are successively produced for transmitting this entity.

An additional or spare module can be provided in the information field of each cell. This spare module, which occupies 11 field bits in this embodiment of the invention, is located directly after the second module in the same field, for example. A final module is provided at the end of the information field of each cell for an error detecting/correcting code and is calculated prior to transmission from a monitored part of the information field which comprises the series of bits constituting the other modules of the information field of the cell including it.

In one embodiment of the invention this code is of the BOSE-CHAUDURI-HOCKENGHEM (B. C. H.) block code type and can correct up to two errors in the part of the information field from which it is calculated.

These B. C. H. codes are described in the second edition of "Error Correcting Codes" by W. WESLEY PETERSON and E. J. WELDON Jr, M. I. T. PRESS, Cambridge, USA.

The code chosen is, for example, a pseudo-code having a length "n" and a number "k" of bits per block of 384 and 366, respectively, based on a known code for which the values of "n" and "k" are respectively 511 and 493.

The last module of each cell is calculated at the interface 4 of the source application 1 and is used at the interface 11 of the destination application 2 to correct any bit transmission errors that may affect the bits of the part of the information field of a cell from which the module was calculated, provided that the number of such errors does not exceed two per cell.

To prevent a defective cell affecting the transmission of two consecutive entities, each entity is padded out with stuffing bits so that it occupies an integer number of second cell modules, which prevents cells containing bits belonging to two separate entities.

In a preferred embodiment of the invention in which the second modules of entity transfer cells comprise 22 words each of 16 bits, the gap that may remain in the second module after the final words not yet transmitted of an entity is filled in with a special word constituting an end of entity marker, this word possibly being repeated. The second module of the last cell for transmitting an entity is therefore padded out to its full capacity.

In a similar way, any cell used to transfer first data bits of a new entity is characterized by inserting start of entity bits at the start of the cell, before the first data bits. For example, this is effected at the sending end by inserting a special word constituting a start of entity marker at the start of the second cell module in which the words including the first data bits of the new entity are placed.

At the receiving end a special word constituting an error marker is substituted for each second module received until a new module containing a start of entity marker is received and detected, starting either from a break in the continuity of the index affecting the series of cells already received or from the impossibility of correcting one word of the monitored part of the information field of a cell using the corresponding detector code placed after it in the same cell.

FIG. 2 shows a block diagram of an interface 4 for the source application 1. The interface receives at a data input D the bits constituting the entities produced, these bits being transmitted by the source application, possibly at a varying bit rate; they are received and processed by a framing device 12. Familiar to the person skilled in the art, the device 12 receives to this end at an input S from the source application a synchronization clock which enables it to distinguish between the entities successively received in the bits arriving at the input D. The device 12 also has a write control input W which the source application 1 activates when sending entity bits.

The source application 1 is additionally connected to an output 0 of the interface 4 to enable the latter to interrupt the sending of entity bits in response to a disturbance likely to compromise the processing of these bits in the interface 4 under the foreseen conditions.

The device 12 is connected to the input of a timing adapter or input buffer 13 of known type which supplies, timed by the local clock H2, the entity bits received from the source application timed by the clock H1. This is to enable processing of these bits by the device to package them in the form of cells.

In the proposed implementation a coding device 14 is connected to the output of the input buffer 13. It produces the first cell modules using incrementing logic (not shown), each of the successive cells used to transfer an entity being assigned a first module obtained by incrementing the first module calculated for the first cell preceding that in which it is located. The coding device 14 also produces the last module of each cell using block coding logic (not shown).

Each last cell module corresponds to a B. C. H. type detector/corrector code as mentioned above. Each error detector/corrector code is calculated from bits taken in blocks which constitute the other information field modules of the cell which is to include it. It is transmitted by the coding device 14 to an output buffer 15 with all the bits which with it will constitute the cell for which it has been calculated.

The local clock H2 used in the interface 4 by the input buffer 13 for sending is also used by the coding device 14 for its transfer operations and by the output buffer 15 for receiving. A transmit clock H3 dependent on the transfer network 3 is used by the output buffer 15 to transmit cells across the network to the intended destination application 2.

The interface 4 supplies the cell bits in succession from the output buffer circuit 15 at an output D. It also supplies a bit clock at an output HD and a cell presence signal at an output P.

FIG. 3 shows a block diagram of an interface 11 for the destination application 2. The interface 11 receives the signals from the outputs D, HD and P which are transmitted to it by the interface 4 over the transfer network 3 and via the receive interface 8 and the associated demultiplexer 9.

These signals are used by an extractor device 17 to separate the information field from the header field of each cell whose bits have been received, this separation being possible using means conventional in the ATM art which need not be described further here.

The information field obtained from the bits received for each cell transmitted is transmitted to a timing adapter buffer 18 which absorbs variations in the timing rate of cells characteristic of ATM networks. The entity bits received are timed by the clock HD. The timing adapter buffer 18 supplies the entity bits timed by a local clock H2' to the processing units on its output side in the interface 11.

A decoder device 19 is connected to the output of the buffer 18. It separates the various modules of each information field received and in particular extracts for processing the final (error corrector code) module. By means of the last module contained in each information field, it can detect errors affecting the bits of other modules of this field and correct these errors provided that the number of bit errors per monitored part of the field is not greater than two.

It transmits separately the bits of the first module of the information field of a received cell, these bits being corrected where this is necessary and possible, and the data bits of the information field other than those concerning the first and the last module of this field, all of this process being known in itself.

The bits of an information field other than those concerning the first and last modules of the field are transmitted to a device 20 for extracting the second module bits for separate transmission. The first module is transmitted to a checker device 21 for checking continuity of incrementing of the first modules successively received and reporting discontinuities corresponding to cells gained or lost. An output buffer 22 is connected between the destination application 2 and the extractor and checker devices 20, 21.

The second modules successively transmitted by the extractor device 20 to the output buffer 22 are intended to be grouped together in this buffer to reconstitute the entities produced by the source application 1. The second leading module of each entity is recognized by the start of entity marker that it contains, and the last second module of each entity is recognized by the end of entity marker(s) that it contains.

As mentioned above, any second module deemed to be incorrect and uncorrectable by the decoder device 19 has its data bits replaced by error marker bits. The error marker is sent to the destination application instead of the erroneous module. The second modules received after an erroneous second module are also replaced by the error marker until a second, non-erroneous module which includes a start of entity marker is received.

Similar substitution is also carried out if the checker device 21 registers an incrementing discontinuity upon the arrival of a new first module, in which case an error marker is substituted for all the second modules, starting with that corresponding to the first module for which an incrementing discontinuity was registered and continuing until a second module containing a start of entity marker is received.

In one embodiment of the invention the parts of the interface 11 on the output side of the input buffer are timed by the local clock H2' and the output buffer 22 supplies the entity data to the destination application 2 via an output (not shown). The destination application also receives a synchronization clock from the device 11, a write control signal for the entity data, and has a command enabling it to interrupt the sending of data by the interface 11 if required.

There is claimed:

1. A method of transmitting an entity from a source application to a destination application over an asynchronous transfer mode (ATM) network, said entity being a modular unit of information independently usable by the destination application and comprising a set of digital data bits representing samples of analog information from the source application, the data bits of said entity being transmitted using a plurality of ATM cells, including a first cell and a last cell, each of said cells containing: a header indicating a destination; and an information field, the method comprising the steps of:

dividing the information field of each of said cells into at least first, second and third modules;

inserting into the first module of each of said cells, a cell continuity index which is incremented modulo p for each successive cell, where p is an integer;

inserting into the second module of each successive cell a portion of the data bits of the entity, such that said plurality of cells contains the set of data bits;

inserting into the third module of each of said cells an error detecting/correcting code calculated from bits contained in other modules of the information field;

including in the second module of the first cell a staff of entity marker;

including in the second module of the last cell an end of entity marker; and transmitting said cells over the ATM network.

2. The method according to claim 1, further comprising the step of:

padding the second module of the last cell with stuffing bits, so that data bits of another entity are not transmitted in the last cell.

3. The method according to claim 1, further comprising the steps of:

receiving at a receiving end said plurality of cells;

monitoring the cell continuity index of each of said cells to detect a break in a continuity of incrementation of the cell continuity index;

using the error detecting/correcting code of each of said cells to determine whether uncorrectable errors exist in the second module; and substituting an error marker for each second module received for a series of cells, until a start of entity marker is detected in a newly received second module, starting either from a detected break in continuity of incrementation of the cell continuity index or from a determination that uncorrectable errors exist in the second module of a received cell.

4. The method according to claim 1, wherein the error detecting/correcting code is a Bose-Chauduri-Hockenghem code.

5. A transmitter for transmitting an entity from a source application to a destination application over an asynchronous transfer mode (ATM) network, said entity being a modular unit of information independently usable by the destination application and comprising a set of digital data bits representing samples of analog information from the source application, the data bits of said entity being transmitted using a plurality of ATM cells, including a first cell having a start of entity marker and a last cell having an end of entity marker, each of said cells containing: a header indicating a destination; and an information field, said information field including first, second and third modules, the transmitter comprising:

entity framing means for processing the data bits of the entity at a clock rate specific to said source application;

adapter buffer means for processing the data bits at a local processing clock rate for packaging the data bits into the second module of successive cells of said plurality of cells, said adapter buffer means including: first generating means for generating a cell continuity index which is incremented and inserted into the first module of each successive cell; and second generating means for generating an error detecting/correcting code which is inserted into the third module of each of said cells, the error detecting/correcting code being calculated from bits contained in the first and second modules; and output buffer means for supplying said cells to said ATM network at a clock rate selected for transmission.

6. The transmitter according to claim 5, wherein the second module of the last cell is padded with stuffing bits, so that data bits of another entity are not transmitted in the last cell.

7. The transmitter according to claim 5, wherein the error detecting/correcting code is a Bose-Chauduri-Hockenghem code.

8. A digital network, comprising:

the transmitter according to claim 5; and a receiver containing means for monitoring the cell continuity index of each of said cells to detect a break in a continuity of incrementation of the cell continuity index, and for using the error detecting/correcting code of each of said cells to determine whether uncorrectable errors exist in the second module; and means for substituting an error marker for each second module received for a series of cells, until a start of entity marker is detected in a newly received second module, starting either from a detected break in continuity of incrementation of the cell continuity index or from a determination that uncorrectable errors exist in the second module of a received cell.

9. A receiver for receiving an entity transmitted from a source application to a destination application over an asynchronous transfer mode (ATM) network, said entity being a modular unit of information independently usable by the destination application and comprising a set of digital data bits representing samples of analog information from the source application, the data bits of said entity being transmitted using a plurality of ATM cells, including a first cell having a start of entity marker and a last cell having an end of entity marker, each of said cells containing: a header indicating a destination; and an information field, said information field including at least first, second and third modules, the first module containing a cell continuity index, the second module containing data bits of the entity, and the third module containing an error detecting/correcting code, the receiver comprising:

- extractor means for dissociating the information field of each of said cells from the header;
- input buffer means for processing at a local processing clock rate the information field data of each of said cells;
- decoder means for separating the first module and the last module from a remainder of the information field of each of said cells and for correcting bits in the information field when no more than two bits are incorrect, using the error detecting/correcting code;
- means for checking the cell continuity index of each of said cells to detect a break in continuity of incrementation of the cell continuity index; and
- means for separating the second module of each of said cells from the remainder of the information field; and
- output buffer means for supplying either the entity or an error marker, the error marker being supplied when a break in continuity of the cell continuity index is detected or when uncorrectable errors exist in the information field of one of said cells.

10. The receiver according to claim 9, wherein the second module of the last cell is padded with stuffing bits, so that data bits of another entity are not received in the last cell.

11. The receiver according to claim 9, wherein the error detecting/correcting code is a Bose-Chauduri-Hockenghem code.

* * * * *